United States Patent
Mies (10) Patent No.: US 10,830,574 B2
(45) Date of Patent: Nov. 10, 2020

(54) COORDINATE MEASURING APPARATUS WITH OPTICAL SENSOR AND CORRESPONDING METHOD

(71) Applicant: Klingelnberg AG, Zurich (CH)

(72) Inventor: Georg Mies, Wipperfürth (DE)

(73) Assignee: KLINGELNBERG AG (CH)

(*) Notice: Subject to any disclaimer, the term of this patent is extended or adjusted under 35 U.S.C. 154(b) by 135 days.

(21) Appl. No.: 15/807,875

(22) Filed: Nov. 9, 2017

(65) Prior Publication Data
US 2018/0128596 A1 May 10, 2018

(30) Foreign Application Priority Data

Nov. 10, 2016 (EP) ..................... 16198080

(51) Int. Cl.
*G01B 11/00* (2006.01)
*G01B 11/24* (2006.01)
*G01B 11/26* (2006.01)

(52) U.S. Cl.
CPC .......... *G01B 11/005* (2013.01); *G01B 11/007* (2013.01); *G01B 11/2416* (2013.01); *G01B 11/26* (2013.01)

(58) Field of Classification Search
CPC ...... A61B 2090/0805; A61B 2090/372; A61B 2090/376; A61B 2090/502; A61B 2560/0487; A61B 2562/0204; A61B 2562/0219; A61B 90/37; G01B 11/005; G01B 11/007; G01B 11/2416; G01B 11/26; G02B 2027/0138; G02B 27/0172;
(Continued)

(56) References Cited

U.S. PATENT DOCUMENTS

2007/0133969 A1* 6/2007 Ish-Shalom .............. G02B 7/04
396/89
2007/0291260 A1 12/2007 Komori et al.
(Continued)

FOREIGN PATENT DOCUMENTS

DE 3934744 A1 4/1991
DE 4142676 A1 7/1993

OTHER PUBLICATIONS

Search Report for Application No. 16198080.0, dated May 4, 2017, 6 pages.

*Primary Examiner* — Sunghee Y Gray
(74) *Attorney, Agent, or Firm* — McCarter & English, LLP (57) ABSTRACT

A coordinate measuring apparatus, comprising a rotatably driveable receptacle for a gear workpiece and a measuring assembly, and configured to perform feed movements and measuring movements of the measuring assembly relative to the gear workpiece on a plurality of axes, the measuring assembly including
an optical switch sensor which operates in a contactless manner,
which is designed as a focus trigger sensor and is arranged on the measuring assembly in such a way that it is able to emit a light beam along an optical axis in the direction of the gear workpiece,
wherein a scanning movement relative to the gear workpiece can be carried out with the focus trigger sensor by using one or more of the axes, and
wherein a switching signal can be provided by the focus trigger sensor whenever the gear workpiece has reached a nominal distance relative to the focus trigger sensor.

20 Claims, 7 Drawing Sheets

(58) Field of Classification Search
CPC .......... G06F 1/163; G06F 3/011; G06F 3/147; G16H 40/63
USPC ................................. 356/601–613
See application file for complete search history.

(56) References Cited

U.S. PATENT DOCUMENTS

| | | | |
|---|---|---|---|
| 2008/0169929 A1* | 7/2008 | Albertson | G08B 13/19613 340/573.1 |
| 2008/0170749 A1* | 7/2008 | Albertson | G06K 9/00355 382/103 |
| 2008/0172261 A1* | 7/2008 | Albertson | G06K 9/00335 382/103 |
| 2015/0077761 A1* | 3/2015 | Yamagata | G01B 11/005 356/601 |
| 2015/0244927 A1* | 8/2015 | Laroia | H04N 5/23212 348/240.99 |
| 2017/0293210 A1* | 10/2017 | Shimizu | G02B 13/04 |
| 2018/0046864 A1* | 2/2018 | Flint | H04N 5/247 |
| 2019/0049233 A1* | 2/2019 | Mies | G01B 11/26 |

\* cited by examiner

COORDINATE MEASURING APPARATUS WITH OPTICAL SENSOR AND CORRESPONDING METHOD

CROSS REFERENCE TO RELATED APPLICATIONS

This application claims priority under 35 U.S.C. §§ 119 (a)-(d) to European patent application no. EP16198080.0 filed Nov. 10, 2016, which is hereby expressly incorporated by reference as part of the present disclosure.

FIELD OF INVENTION

The invention relates to a coordinate measuring apparatus with an optical sensor and to a corresponding method for optically measuring gear workpieces.

BACKGROUND

In many technical areas the exact measurement of a component is of great importance.

There are, for example, various measuring devices for tactile detection of the quality and profile of surfaces. Typically, a probe tip is guided over the surface to be measured during mechanical scanning. The result is a signal recorded over the scanning path, which permits statements about the surface profile.

There is a need to carry out such measurements as far as possible in-line during a production process, wherein the mechanical scanning mentioned is very precise but unfortunately also quite slow. For the integration into a production process, mechanical measuring is therefore not suitable in most cases. Today, mechanical scanning methods are therefore used for example to test individual components from a serial production by way of example, in order then to be able to intervene in the ongoing production process in the event of deviations.

At first glance, optical measurement could be an alternative to mechanical measurement. The use of optically measuring sensors would be ideal. However, it has been recognized that the optically measuring sensors are not suitable for the requirements for the gear measurement for various reasons. The special requirements or criteria applicable to a gear measurement are: unfavourable scanning angle; smooth surfaces of the tooth flanks for example; shading through adjacent teeth; and high demands on the measuring accuracy (in the range of 0.1-0.3 micrometers).

Although the well-known interferometric sensors are very precise and have a very high resolution, their measuring range is small. The distance of this sensor type to the surface must be very small and the acceptance angle is very narrow. In addition, such interferometric sensors are very expensive.

Sensors operating on the principle of a laser triangulation sensor are fast and have a wide acceptance angle. Unfortunately, however, the laser triangulation sensors are not sufficiently accurate for gear measurements, i.e. such sensors would only be usable with significant limitations.

Chromatic sensors have a high resolution, but require a large numerical aperture if one wishes to meet the above conditions. In addition, chromatic sensors which could be suitable in principle have a broad light cone. Shading can lead to a significant reduction in the acceptance angle. If the chromatic sensor is positioned more steeply (i.e. if a steeper scanning angle is specified), the problems with shading can be partly avoided. However, at a steep scanning angle, the sensor does not receive a useful signal.

There is a need to be able to perform rapid measurements in the production of Gear workpieces in order to be able to ideally test every single gear workpiece during or immediately after production.

SUMMARY

An object of the invention is therefore to provide a device and a corresponding method which make it possible to carry out rapid and precise measurements on gear workpieces.

The object is achieved according to some embodiments by one or more coordinate measuring apparatus disclosed herein and by one or more methods disclosed herein.

A coordinate measuring apparatus according to some embodiments may comprise a plurality of axes, a rotatably drivable receptacle for a gear workpiece to be measured, and a measuring assembly, wherein the coordinate measuring apparatus is designed to perform relative feed movements and measuring movements of the measuring assembly relative to the gear workpiece. The coordinate measuring apparatus according to some embodiments may be characterized in that the measuring assembly comprises an optical switch sensor operating in a contactless manner, which is designed as a focus trigger sensor, wherein the focus trigger sensor is arranged on the measuring assembly in such a way that it is able to emit a light beam along an optical axis in the direction of an object plane of the gear workpiece, wherein a feed movement relative to the object plane of the gear workpiece can be executed with the focus trigger sensor using one or more of the axes, and wherein a switching signal can be provided by the focus trigger sensor as soon as the focus trigger sensor has reached a nominal distance relative to the object plane.

In some embodiments, at least one of the axes is designed as an NC-controlled axis.

Some of the embodiments are based on the use of at least one optical switch sensor, which permits a highly precise and fast spacing determination, in that this switch sensor outputs a switching signal when the nominal distance is reached. If the optical switch sensor, as is the case with the present invention, is used in a coordinate measuring apparatus with highly precise mechanical positioning of the individual axes (which can be partially or completely NC-controlled), then the optical switch sensor can be moved exactly towards the nominal distance to a surface to be measured, to a line or a point. At the moment the optical switch sensor outputs the switching signal, the momentary coordinate information (actual data) of the coordinate measuring apparatus, for example, is read out and/or (intermediately) stored. From the momentary coordinate information, the position of the focus point on the surface can be precisely determined taking into account the nominal distance.

In some embodiments, the measuring methods comprise only a small number of linear relative feed and/or measuring movements, together with one or more full revolutions of the gear workpiece. Such embodiments use the high speed of optically switching measurement.

In some embodiments, the measurement methods are based on the fact that the gear workpiece is rotationally driven while the optically switching sensor carries out measurements. In this case, particular attention is given to the fact that the sensor does not have to be brought into the nominal distance by means of relative feed movements in each case measuring point for measuring point. Changing the relative distance of the sensor from the surface to be measured results from the fact that the relative distance of this surface changes as a result of the rotational movement of the gear workpiece.

To date, a tactile pitch measurement on one gear workpiece per tooth flank has lasted several seconds, which can result in a measurement time of up to several minutes for the entire gear workpiece. With a coordinate measuring apparatus, which is equipped with an optical switch sensor and a control system in the form of hardware and/or software, the pitch measurement can be carried out on all tooth flanks of the same gear workpiece within a few seconds to well below one minute.

Some embodiments rely on the use of focus trigger sensors as optical switch sensors. These focus trigger sensors have a high light intensity and use a very small light point due to their physical function principle. This light point is thus very bright. Even at steep scanning angles, a usable part of the light is reflected back into the (receiving) optics of the sensor. These are advantageous features regarding the use of such focus trigger sensors for gear measurements.

It is another advantage of the focus trigger sensors of some embodiments that the "light cone" is particularly slim when a laser is used as an emitter. A particularly slender light cone is equivalent with a reduction of shading. Therefore, laser-based focus trigger sensors are particularly suitable for measuring tooth flanks.

A focus trigger sensor has only one characteristic distance (nominal distance), which it measures highly accurately. Linearity errors of the sensor system or optical errors of the lenses, which could lead to the measurement signal being faulty, are excluded by this principle. However, this principle has the disadvantage that focus trigger sensors are only suitable for indirect measurement by changing the distance of the sensor from the surface in order to find the nominal distance measuring point for measuring point. This requires a highly accurate, measuring linear axis. Compared to directly measuring optical sensors, this indirect measurement is unattractive for many applications.

However, the method for gear measurement according to some embodiments does not use the change in the distance of the sensor from the surface by movement of the sensor, but by the continuous rotation of the gear and the arrangement of the sensor against the gear surface. Thus, the particular characteristics of the gear are used, namely the periodically recurring approach of the tooth flanks to the light beam of the sensor is used, during continuous rotation. The sensor is triggered whenever the surface reaches the nominal distance to the sensor.

For measuring, some embodiments therefore do not use (linear) readjustment parallel to the optical sensor axis in order to reach the focus (the nominal distance).

Some embodiments thus make use of a suitable overall system in which the relative distance between the surface of the gear and the sensor changes periodically. A trigger signal is generated in each case when the nominal distance is reached and the momentary position values are recorded for further processing in order to determine the momentary relative position in the coordinate system. In the actual implementation of the measuring method of some embodiments, the system is not based on a linear displacement of the sensor but on a continuous rotational movement of the gear workpiece.

The method of some embodiments is particularly suitable for a pitch measurement, in which a rapid, continuous rotational movement of the gear workpiece is carried out while the sensor rests (at least at times) relative to the rotational axis of the gear workpiece. This allows a fast recording of measured values.

The method of some embodiments is also suitable, for example, for a measurement of the flank lines of tooth flanks, in which a rapid, continuous rotary movement of the gear workpiece is carried out while the sensor is moved linearly parallel to the rotational axis of the gear workpiece. This allows the flank line of all teeth to be determined in a short time.

The device according to some embodiments and the method of some embodiments enable fast gear measurements because no readjustment is required and a continuous, fast rotation is utilized. Moreover, the invention is very precise and cost-effective.

Advantageous embodiments of the coordinate measuring apparatus and of the method are disclosed herein.

The embodiments disclosed herein can be used in conjunction with 1D, 2D and 3D surface measurements on gearwheels.

BRIEF DESCRIPTION OF THE DRAWINGS

Embodiments of the invention are described in more detail below with reference to the drawings.

DETAILED DESCRIPTION OF EMBODIMENTS

In the context of the present description, terms are used which are also used in relevant publications and patents. It should be noted, however, that the use of these terms is merely intended to provide a better understanding. The inventive concept and the scope of protection of the patent claims are not to be limited by the specific choice of the terms. The teaching presented herein can be readily applied to other conceptual systems and/or subject areas. In other subject areas, the terms shall be applied mutatis mutandis.

Figure 1:
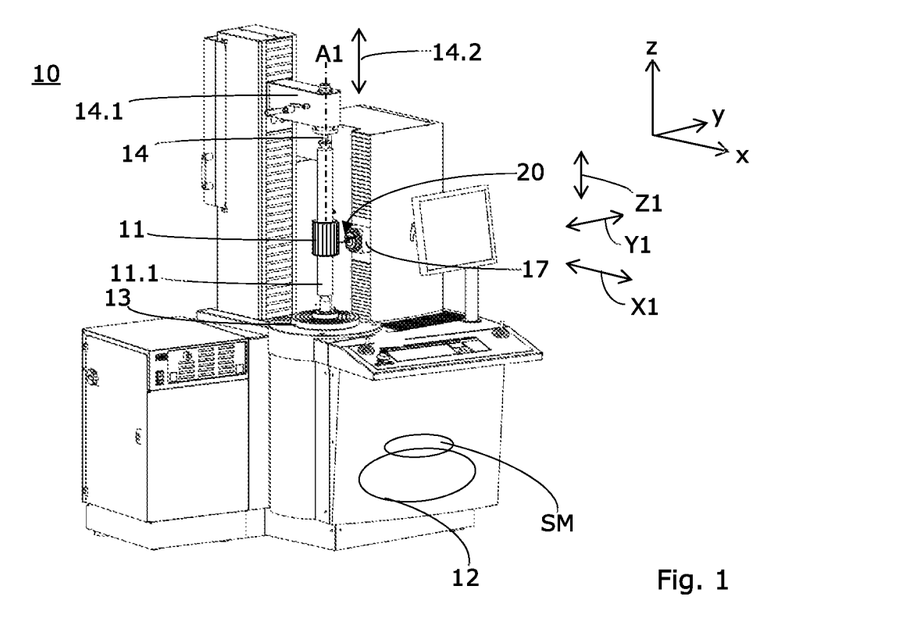
FIG. 1 shows a perspective view of a coordinate measuring apparatus provided with an optical switch sensor according to one embodiment.

In an advantageous embodiment, which is shown in FIG. 1, an automatic, CNC-controlled gear measuring center 10, which is generally referred to here as a coordinate measuring apparatus 10, is concerned. The coordinate measuring apparatus 10 is, in principle, suitable for checking spur gear teeth, as well as cutting and grinding wheels, worms and worm gears, hobs, bevel gears and general dimensional, shape and positional deviations on rotationally symmetrical workpieces, for curve and camshaft measurement or also for rotor measurement, to name only a few possible applications.

Within the scope of the teaching presented herein, however, the fast and reliable measurement of gear workpieces 11, such as spur gears, bevel gears and the like, is concerned.

In the example shown, the coordinate measuring apparatus 10 comprises a (rotary) table 13, which can be driven by means of an NC controller 12, and an entrained centering means 14. The (rotary) table 13 and the entrained centering means 14 are arranged such that a component 11 to be measured can be clamped coaxially between the (rotary) table 13 and the centering means 14, as shown in FIG. 1 by means of a spur gear 11. The teeth of the spur gear 11 are shown here and in FIG. 2 only in an illustrative manner.

In the example shown, the spur gear 11 has a shaft 11.1, which extends upwards and downwards. The NC controller 12 is connected to the drive units or motors of the various axes of the coordinate measuring apparatus 10. These details are not visible in FIG. 1 since these elements are located behind a cladding.

In some embodiments, a driver (not shown) is connected in an interlocking manner to the (rotary) table 13, which is rotatable about a first axis of rotation A1 by a rotary drive, controlled by the NC controller 12. The centering means 14 can, for example, be seated on an arm 14.1, which can be displaced in height, as indicated by the double arrow 14.2. Within the arm 14.1, the entrained centering means 14 is mounted in such a way that it can rotate about a vertical axis which coincides with the axis of rotation A1, and that it can be displaced upwards against a restoring force when the gear workpiece 11 is clamped.

The coordinate measuring apparatus 10 does not necessarily have to be equipped with an entrained centering means 14 or counter-holder. Also, the structure of the (rotary) table 13 and the attachment of the gear workpiece 11 to the (rotary) table 13 may be different, as required.

Figure 2:
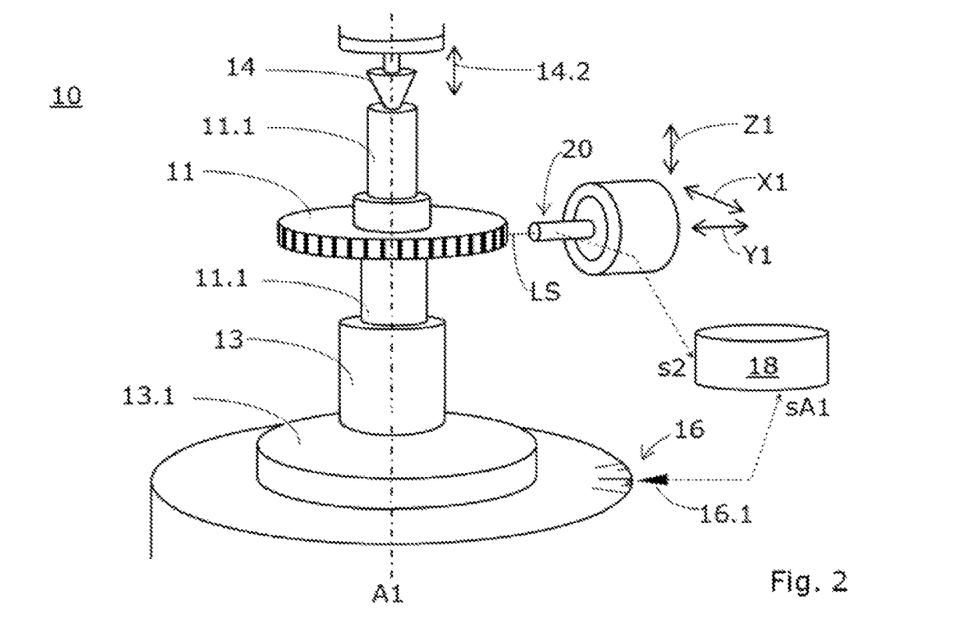
FIG. 2 shows an enlarged perspective view of a portion of a coordinate measuring apparatus of an embodiment including an optical switch sensor.

Details of a further advantageous embodiment are shown in FIG. 2.

In the coordinate measuring apparatus 10 of at least one embodiment, the rotary table 13 is associated with an angle measuring system 16 (angle sensor), which provides signals sA1 which permit an accurate statement about the drive-side angular position of the driver, or the (rotary) table 13. The angle measuring system 16 can be arranged below the table 13, for example, and is therefore not visible in FIG. 1. In FIG. 2, such an angle measuring system 16 is schematically represented at the right edge by an angle scale with a black pointer 16.1, which provides the signal sA1.

The angle measuring system/angle sensor 16 can provide signals sA1, which permit a statement about the momentary drive-side angular position of the (rotary) table 13 and thus of the component 11. In FIG. 2, the provision of the signal is indicated by a dashed arrow with the designation sA1.

According to an embodiment, the coordinate measuring apparatus 10 can comprise a plurality of NC-controlled axes. In the exemplary embodiment shown, these are three linear axes X1, Y1, Z1 and the already mentioned axis of rotation A1. These axes X1, Y1, Z1, A1 are designed to perform relative feed movements and relative measuring movements of the measuring assembly 17 together with an optical switch sensor 20, which is attached thereto, relative to the component 11. The actual relative measuring movement is generated by the rotary drive of the gear workpiece 11 about the rotational axis A1. A change in the distance, e.g. by linearly advancing the sensor with the Y1 axis, does not take place during the actual measurement.

The optical switch sensor 20 is a sensor which operates in a contactless manner and which is designed as a focus trigger sensor. FIGS. 1 and 2 schematically indicate that the focus trigger sensor is arranged on the measuring assembly 17 in such a way that it is able to emit a light beam LS along an optical axis in the direction of an object plane OE of the component 11. Due to the fact that the optical switch sensor 20 is disposed on the measuring assembly 17 of the coordinate measuring apparatus 10, as indicated in FIGS. 1 and 2, this optical switch sensor 20 can perform a feed movement relative to the object plane OE of the gearwheel 11 by using one or more of the NC-controlled axes X1, Y1, Z1, A1.

Figure 8A:
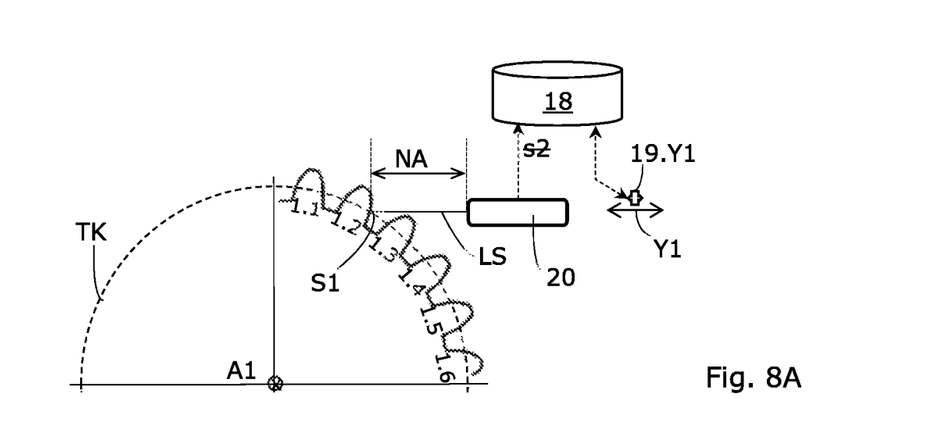
FIG. 8A shows, in a schematic top view, a section of a spur gear together with the exemplary beam path of an optical switch sensor in a starting position.
Figure 8B:
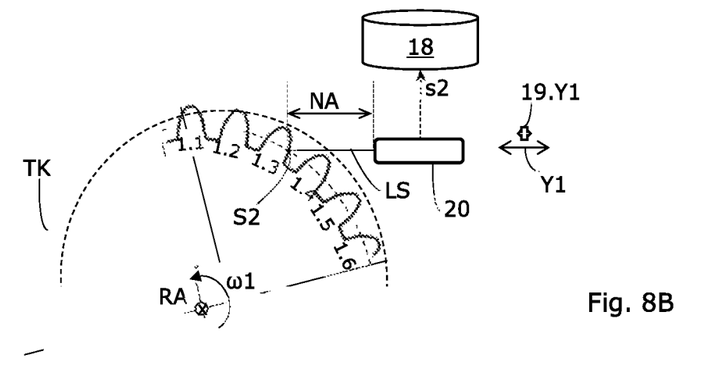
FIG. 8B shows, in a schematic top view, a section of the spur gear and switch sensor of FIG. 8A when measuring the right flank of another tooth of the spur gear.
Figure 8C:
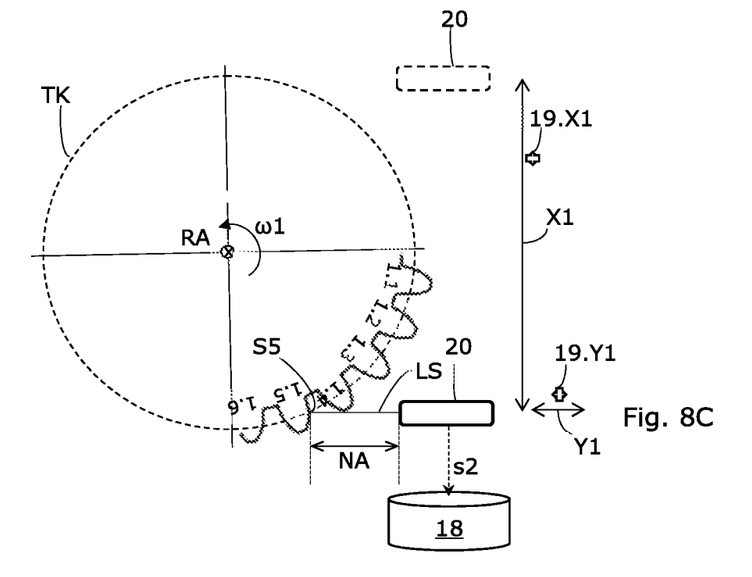
FIG. 8C shows, in a schematic top view, a section of the spur gear and switch sensor of FIG. 8A when measuring a left flank of a tooth of the spur gear.

As soon as the optical switch sensor 20 has reached a suitable measuring position, the gear workpiece 11 is rotated about the axis of rotation A1. By periodic distance changes which result from the teeth arranged periodically on the gear workpiece 11, the optical switch sensor 20 moves from time to time (ideally once per tooth flank) into a position relative to the surface of the tooth flanks which corresponds to the nominal distance NA (as shown in FIGS. 8A-8C). At this moment, the switch sensor 20 triggers a respective switching signal s2.

The arrangement of the NC-controlled axes X1, Y1, Z1, A1 shown in FIGS. 1 and 2 is to be understood as an example. The NC-controlled axes can also be arranged differently and the number of NC-controlled axes can also be less than shown in FIGS. 1 and 2 for example.

A focus trigger sensor may be an optical switch sensor 20 which always provides a switching signal s2 when the sensor reaches the nominal distance NA relative to the object plane OE.

In some embodiments, the optical switch sensor 20 is advanced along its optical axis in the direction of the object plane OE by the use of one or more of the NC-controlled axes X1, Y1, Z1, A1. As soon as the nominal distance NA to the object plane OE has been reached, the switch sensor 20 emits a switching signal which is designated by the reference symbol s2 in FIG. 2.

In some embodiments, the corresponding starting position may be completely outside the tooth gaps of the gear workpiece 11, so that this component 11 can be rotated without collision with the sensor 20.

Since the relative feed movement of the switch sensor 20 relative to the object plane of the component 11 in an exactly defined coordinate system (e.g. in the x, y, z coordinate system), the coordinate measuring apparatus 10 can store and/or evaluate the actual position of the switch sensor 20 relative to the object plane OE of the gear workpiece 11 when the switching signal s2 occurs.

The actual measuring method is then started based on this starting position, which was approached for example by linearly advancing the sensor 20 relative to the object plane OE of the gear workpiece 11 and by monitoring the switching signal s2. In most cases, the measuring method includes the rotational movements of the gear workpiece 11 and, in some cases, the sensor 20 can be displaced relative to the gear workpiece 11 (e.g. parallel to the axis of rotation A1 for measuring the (longitudinal) flank profile).

The coordinate measuring apparatus 10 may comprise at least one displacement sensor 19, which is assigned to one of the plurality of NC-controlled axes X1, Y1, Z1 (as shown in FIGS. 8A-8C), and at least one angle sensor 16, which is assigned to the rotationally drivable receptacle 13, 14. The displacement sensor 19.X1 of the X1 axis represents the signal sx1 for example. The signal of the displacement sensor 19.Y1, which is assigned to the Y1 axis, is designated by sY1 and the signal of the displacement sensor 19.Z1 of the Z1 axis is designated by sZ1. The displacement sensors are indicated in FIGS. 8A to 8C.

Once the switching signal s2 of the switch sensor 20 is applied (i.e. when the switch sensor 20 has been triggered), all the actual values of the affected axes can be stored for example, i.e. the signals of one or more of the linear axes sX1, sY1, sZ1 and the angle indication of the angle sensor 16 can be written into a memory for example.

For this purpose, the coordinate measuring apparatus 10 can comprise a memory 18, or the coordinate measuring apparatus 10 can be connected to a memory 18 which is adapted to store the actual data of the at least one displacement sensor 19 and of the at least one angle sensor 16 as soon as the autofocus sensor provides the switching signal s2. In FIG. 2, it is indicated by dashed signal arrows sA1, s2 that these signals were transferred, for example, to the memory 18.

The transfer of the signals originating from the displacement sensor 19 and the angle sensor 16 may be triggered by the switching signal s2.

Depending on the definition of the switching signal s2, this switching signal s2 can be applied, for example, to an enable input of a gate. If the switching signal s2 changes from a logic "0" to a logic "1", the enable input produces the opening of a memory access to the memory 18, for example, so as to transfer the actual data (e.g. the signals sA1, sX1, sY1, sZ1) into the memory 18.

Since the nominal distance NA of the switch sensor 20 and thus also the position of the trigger point at the front end of the nominal distance (or the light beam LS) is a known quantity, the position of the corresponding measuring point of the object plane OE can be precisely determined by calculation from the actual data of the displacement/angle sensors. The various embodiments are based on this principle.

There are various focus trigger sensors which are suitable for use in a coordinate measuring apparatus 10 and which can provide information that can be quickly and reliably utilized with sufficient accuracy, for example, when measuring gear workpieces 11.

The focus trigger sensor can, for example, be a sensor 20, the function of which is based on a 4-quadrant measuring approach.

As a receiving device, charge-coupled devices (CCDs) can be used, for example, in some or embodiments, wherein several of these CCDs are arranged in a particular pattern with respect to each other in order be able to recognise whether an optical transmitter of the switch sensor 20 has reached the nominal distance NA to a surface (object plane OE). Once the pattern of the CCD elements is illuminated in a predetermined manner by reflected light, the correspondingly equipped focus trigger sensor can output the switching signal s2.

In the specifically mentioned 4-quadrant measurement approach, the CCDs, or other light-sensitive components, are arranged as four quadrants adjacent to one another in a common plane. This common plane is exactly perpendicular to the center beam of the light beam LS reflected at the object plane OE. If all four quadrants receive exactly the same light quantity, then the switching signal s2 will output.

The four-quadrant measuring approach described here can also be implemented with light-sensitive components, the light-sensitive region of which is subdivided into 2 segments, for example, instead of the aforementioned 4 segments.

A passively operating focus trigger sensor may be used as the switch sensor 20 in some or all embodiments. The word "passive" describes here that this switch sensor 20 does not have any means for adapting the radiation optics (e.g. for moving lenses or for adjusting a lens group 21, see FIG. 3). This means that a passively operating focus trigger sensor has no zoom or autofocus optics. In the present context, a passively operating focus trigger sensor has a fixedly predetermined nominal distance NA, which can be adjusted at most for the purpose of fine tuning (e.g. during maintenance). The word "focus" does not refer here to an automated adjustment of the focus or of the nominal distance NA of the optical transmitter of the switch sensor 20, but to the automated recognition of whether the nominal distance NA is reached. This automated recognition is carried out by a suitable arrangement and/or (switching) wiring of optically sensitive receiving sensors (such as CCDs, phototransistors or photodiodes).

Figure 3:
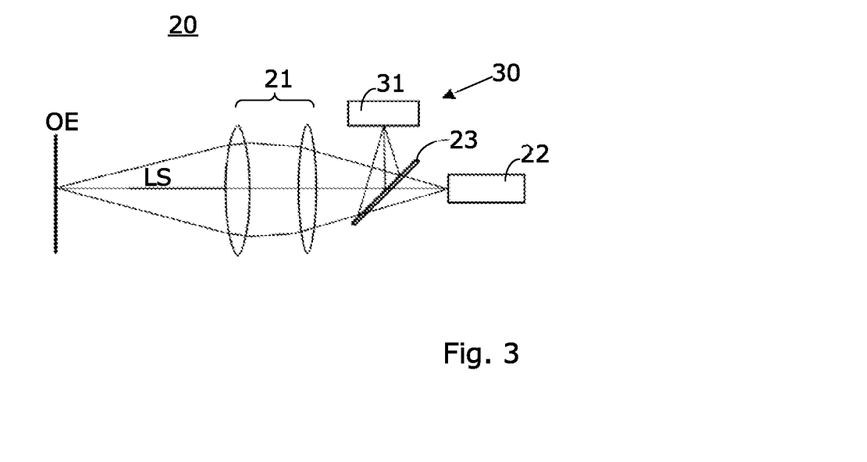
FIG. 3 shows a schematic representation of the elements and the beam path of an exemplary optical switch sensor.

FIG. 3 shows the principal structure and beam path of an exemplary switch sensor 20 in a schematic form. This illustration is merely an example which is used for explanation purposes.

A light beam LS emanating from a point-shaped source 22 is shown in FIG. 3. The light beam LS is guided through a beam splitter 23. A beam splitter cube, prism or a semi-transparent mirror can be used, for example, as a beam splitter 23. This is followed by an imaging lens, which is shown here by way of example and schematically by means of a lens group 21. The (laser) light source, which here serves, for example, as the source 22, is illustrated in the drawing by a rectangular switching block.

The light reflected from the object plane OE reaches an optical receiver 30 via a partially reflecting layer of the beam splitter 23. The optical receiver 30 can, for example, comprise one or more diaphragms and other optical elements. The optical receiver 30 may comprise a detector 31 which is illustrated in FIG. 3 by a rectangular switching block.

The optical receiver 30 may, for example, comprise two pinhole diaphragms which are located in front of the detector 31. Whenever the distance between the object plane OE and the switch sensor 20 increases or decreases for example, the reflected light components are increasingly blocked by the pinhole diaphragms. On the other hand, the reflected light components reach a receiving surface of the detector 31 with maximum intensity when the superimposition of the light points generated by the two pinhole diaphragms lie precisely one above the other.

By evaluating an analog output signal from the detector 31, for example, the intensity maximum can be determined. Once the nominal distance NA has been reached, the received light intensity is at the maximum and the switch sensor 20 can output the switching signal s2.

Figure 4:
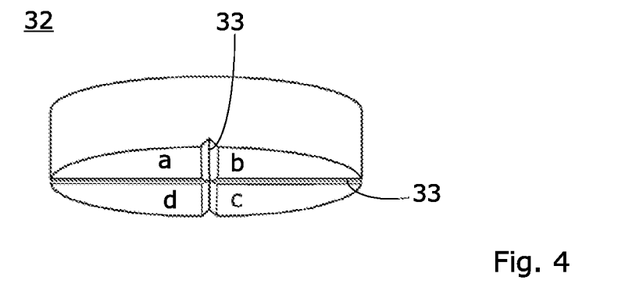
FIG. 4 shows a schematic perspective view of a photo-diode whose light-sensitive region is divided into four segments.

A detector 31 can also be used as a four-quadrant receiver without pinhole diaphragms. FIG. 4 shows in a purely schematic form a (silicon) photodiode 32 of the prior art whose light-sensitive surface is subdivided into four equal segments a, b, c, d (the described approach also works, for example, with only two equally large segments). The segments a, b, c, d form four quadrants situated close to one another in a common plane. For the electrical separation of the quadrants, V-shaped trenches 33 are provided, for example. The (silicon) photodiode 32 of FIG. 4 is deliberately shown in an orientation in which the sensitive surface faces downwardly. In the shown orientation, the diode 32 can be used, for example, in the detector 31 of FIG. 3.

Figure 5:
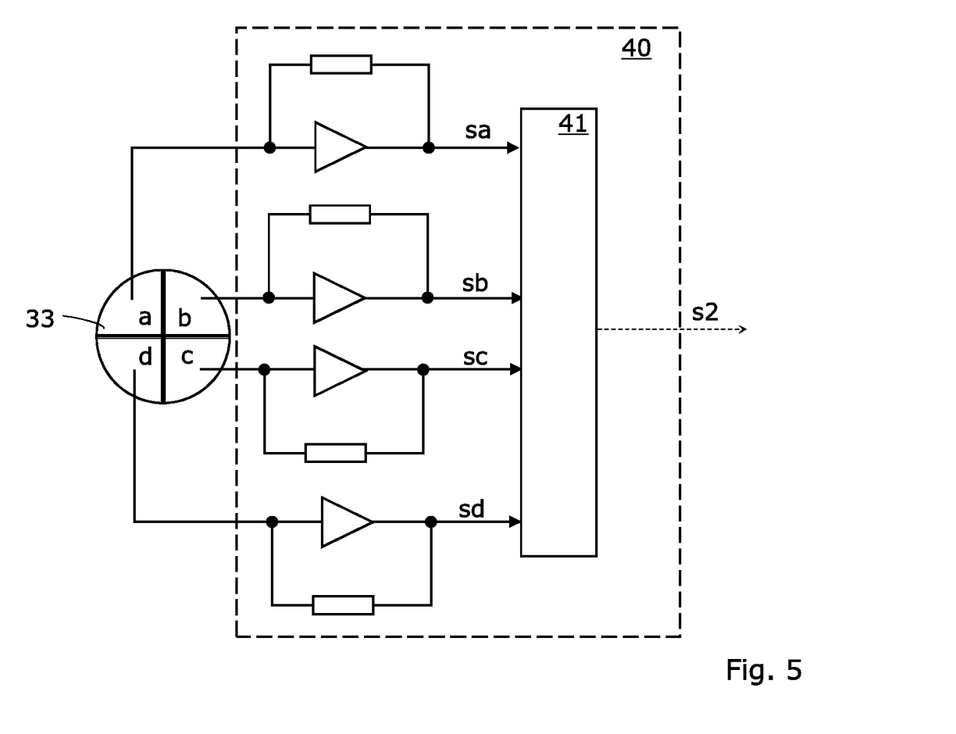
FIG. 5 shows the block diagram of an exemplary evaluation device suitable for use with a photodiode of FIG. 4.

The functional principle of such a (silicon) photodiode 32, which is subdivided into four quadrants a, b, c, d, will now be described by way of example with reference to FIG. 5, wherein only one of several implementation solutions is shown in FIG. 5.

In FIG. 5 the (silicon) photodiode 32 of FIG. 4 is shown from above. The light-sensitive surface lies parallel to the drawing plane in this case. Each of the four segments a, b, c, d can, for example, be connected to a separate evaluation circuit of an evaluation device 40, as schematically indicated. Each of these evaluation circuits here comprises an amplifier stage, shown by way of example, with feedback. Such circuits are sufficiently known and are therefore only shown in an illustrative manner. The amplifier stage high-amplifies the output signal of each segment a, b, c, d. The output signals are designated by sa, sb, sc, and sd. Then, these four high-amplified signals are supplied to a comparator circuit 41.

Figure 6A:
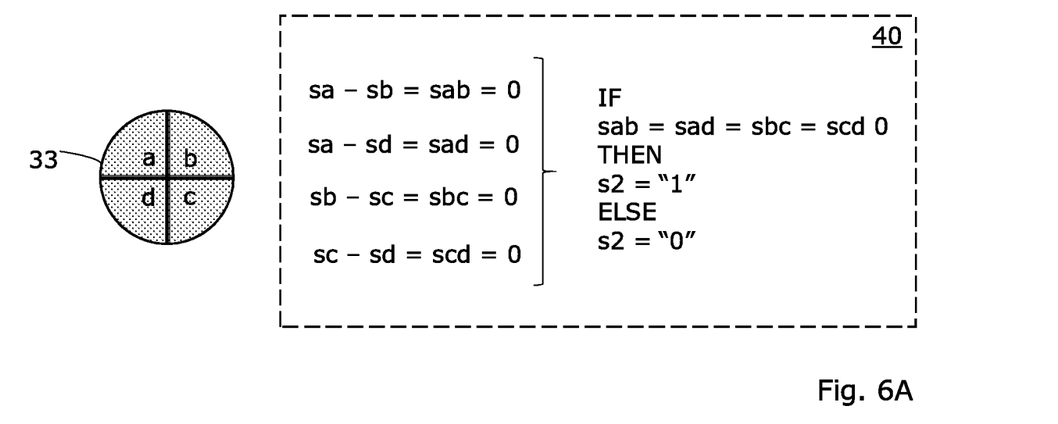
FIGS. 6A-6C schematically show three different lighting situations and the corresponding logical evaluation of the signals of the four individual diode segments.
Figure 6B:
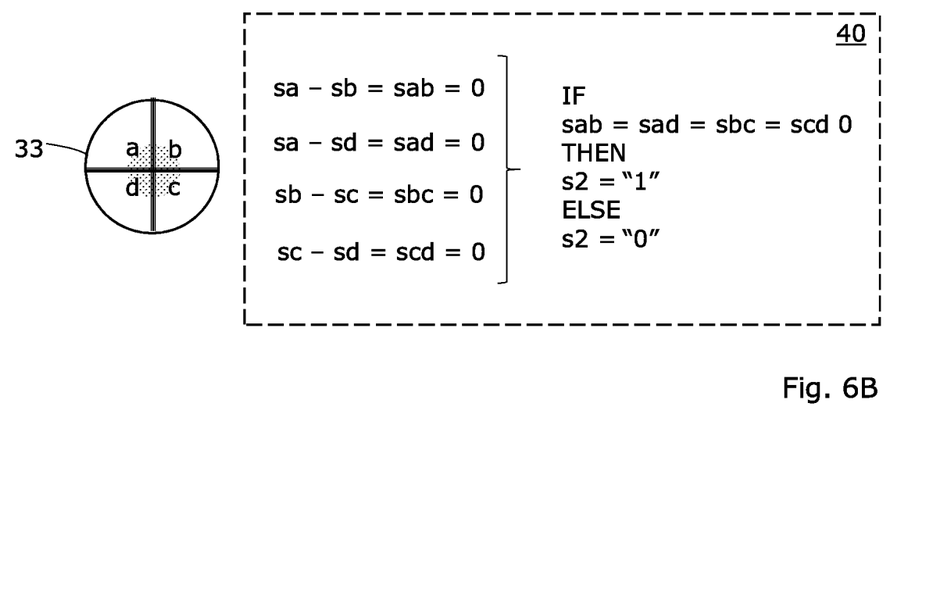
Figure 6C:
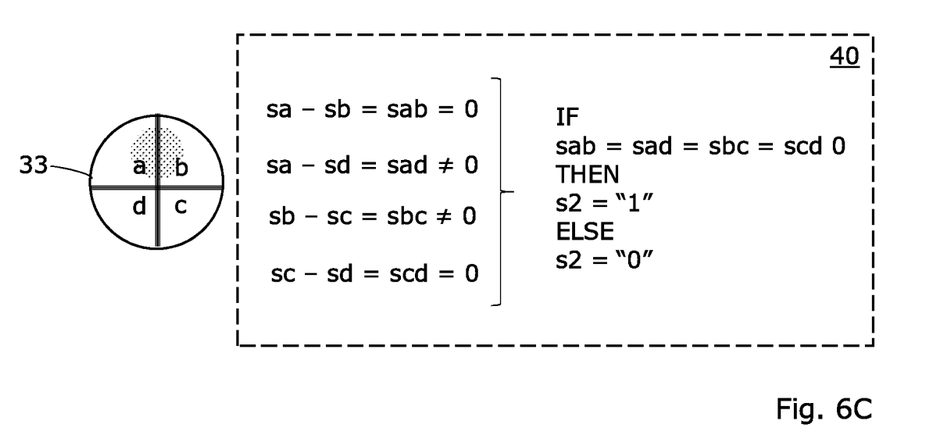

The comparator circuit 41 is designed as a difference measurer in the example shown. The principle is explained below with reference to an example. In FIGS. 6A-6C, only the (silicon) photodiode 32 of FIG. 4 and the internal logic operations of the evaluation device 40 are shown. The logical evaluations which can, for example, run in such an evaluation device 40, are described by way of example in the form of equations.

If all the four segments a, b, c, d are uniformly illuminated, which is the case when the reflected light beam impinges centrally perpendicularly to the light-sensitive surface, all four signals sa, sb, sc and sd are identical. A difference formation in pairs of two each of the signals sa, sb and sc, sd produces zero in each case, as shown in FIG. 6A by the four equations sa−sb=sab=0, sa−sd=sad=0, sb−sc=sbc=0 and sc−sd=scd=0. If then the results sab, sad, sbc, and scd of these two difference measurements are related to one another again (e.g. by a further difference measurement), it can be determined whether all four segments a, b, c, d receive exactly the same light intensity in the moment to be evaluated.

In FIG. 6A, the logical connection of the signals sa, sb, sc, sd is shown on the basis of a pseudo-programming language which performs an IF-THEN-ELSE evaluation. If all the signals sa, sb, sc, sd are equal to zero, the switching signal s2 is set to a logic "1". This means that a switching signal s2 is output in this case. In all other cases, the switching signal s2 remains at a logic "0".

At the output of the evaluation device 40, a trigger circuit can be provided, for example, which provides an output signal s2. The output signal s2 can, for example, be changed from a logic "0" to a logic "1".

The principle of FIG. 6A also works when the four segments a, b, c, d are not completely illuminated as long as all segments a, b, c, d receive the same light intensity. A corresponding example is shown in FIG. 6B. Also in the case of FIG. 6B, the output signal s2 would be changed, for example, from a logic "0" to a logic "1".

A situation will now be described with reference to FIG. 6C which is obtained when the nominal distance NA is not reached. In this case, the light spot of the reflected light is, for example, in the region of the two segments a and b. The segments c and d do not receive any light in this case. Two of the four equations are not equal to zero in this case. Thus, the following equation would again yield a zero: sab−scd=0. Since not all signals or terms sa, sb, sc, sd are equal to zero, the condition sa=sb=sc=sd=0 is not satisfied. This makes it possible to infer an uneven illumination of the segments a, b, c, d. In this case, the switching signal s2 remains at logic "0".

In certain embodiments, which are based on the use of a 4-quadrant measuring approach, a rule set may be used for evaluating the signals of the four segments a, b, c, d which is designed in such a way that all important special cases and situations can be reliably detected.

The rule set can be implemented in the form of a logic gate circuit. However, it can also be implemented in the form of software, as shown by the pseudo-programming language of FIGS. 6A to 6C. In the latter case, the signals of the four segments a, b, c, d may be digitized before they are processed by means of a corresponding software-implemented rule set.

There is a wide variety of possibilities for establishing comparators in order to be able to compare the intensities according to the principle shown in FIGS. 5 and 6A-6C and described here. The matter described here shall merely be understood as an example.

It can be postulated in general that a focus trigger sensor, which operates according to the 4-quadrant measuring approach, comprises on the receiver side four sensor regions a, b, c, d which are arranged in a common plane like four quadrants to one another. Each of these four sensor regions a, b, c, d is connected to a respective measuring input of an evaluation device 40, as shown in FIG. 5 for example, in order to provide the switching signal s2 as soon as all four sensor regions a, b, c, d receive the same reflected light intensity of the light beam.

According to other embodiments, a focus trigger sensor is used whose function is based on the Foucault principle. Such a focus trigger sensor has an imaging optical system 21 for emitting the light beam LS on the transmitting side, for example, and two or more than two differential diodes on the receiving side for receiving the light beam reflected at the object plane OE. According to the Foucault principle, a Foucault optical cutting edge is superimposed for example, which makes it possible to detect the reaching of the nominal distance NA more quickly and clearly, depending on whether the one half or the other half of the optical beam path is shaded by means of the optical cutting edge. This results in a clearly recognizable contrast transition.

Instead of using a Foucault optical cutting edge, a pattern, a mark, or a symbol can also be used for imaging purposes, similar to the aforementioned cutting edge.

The Foucault principle can also be used in embodiments which, similar to the one shown in FIG. 5, for example, comprise a plurality of photodiodes or segments on a photodiode. If the nominal distance NA has not yet been reached, the light intensity can shine on the two segments a and b for example, as shown in FIG. 6C for example. If the nominal distance NA has exactly been reached, all four segments a, b, c, d are uniformly illuminated, as shown in FIG. 6B. If the nominal distance NA is not reached, the light intensity can shine on the two segments c and d for example.

Figure 7:
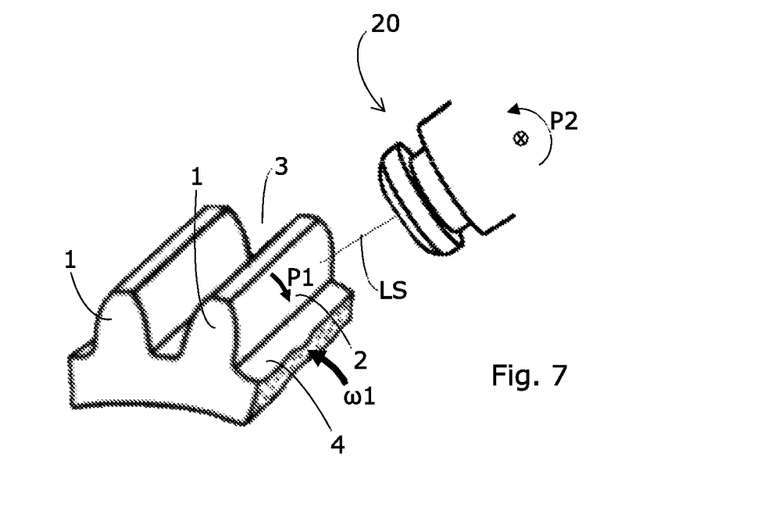
FIG. 7 shows a schematic perspective view of a section of a spur gear together with an optical switch sensor.

FIG. 7 shows a perspective view of a section of a spur gear 11 together with an exemplary optical switch sensor 20. FIG. 7 shows approximately the typical dimensions of a suitable optical switch sensor 20 in relation to the nominal distance NA (which is 20 mm in the example shown) and a small spur gear 11, which here has a pitch circle diameter which is approximately 70 mm.

Due to the shading, which can result from neighboring teeth 1 sitting closely adjacent to one another, the light beam LS of the optical switch sensor 20 has to be inclined obliquely on the surface to be measured (e.g. to the tooth flank 2) in almost all applications. The deeper the light beam LS has to penetrate into a tooth gap 3 for measuring, the steeper the light beam LS must be.

In the example shown in FIG. 7, the optical switch sensor 20 is turned counter clockwise to the left from the shown position when the light spot generated by the light beam LS on the surface of the tooth flank 2 moves downwardly along the tooth flank 2 in the direction of the tooth root 4. The traveling of the light spot downwards is schematically indicated in FIG. 7 by a short arrow P1. The corresponding rotation of the switch sensor 20 is indicated by the arc-shaped arrow P2. These movements P1, P2 may be carried out within the scope of the feed movement, which serves to reach the starting position.

In the example shown in FIG. 7, the light beam LS is tilted relative to the tooth surface.

Referring to FIGS. 8A to 8C, an embodiment is described now, which is based on a displacement of the sensor 20 in the X and Y direction together with the rotational driving of the gear workpiece 11.

If, in FIG. 8A for example, the sensor 20 is moved over the X and Y axes such that the focal point is shifted at the nominal distance NA at the front end of the light beam LS on the pitch circle TK and thereby also moves the gear workpiece 11, any desired angle can be specified relative to the tooth surface.

It has been recognized that even when the light beam LS impinges obliquely, a usable reflected light component can be received at the detector 31. This is because the surface of the gear workpieces 11 (e.g. in the case of gear flanks 2) has a roughness which ensures a sufficiently good reflection behaviour.

However, it is obvious that there are certain limits for the reflection of a light component with sufficient intensity. If, for example, the light beam LS runs tangentially along a tooth flank 2, then no usable results can be expected any more.

It is an advantage of the switching sensor 20 that this provides a very accurate signal even at steep scanning angles. Particularly when using a laser as light source 22, a high light intensity can be used, so that even at steep angles, some light is still reflected back into the receiver 31.

A special method presented herein makes use of a very small, very bright light spot, which always has the same nominal distance NA regardless of the inclination of the surface, so that an accurate signal s2 is always generated. It is no longer possible to measure only when the scanning angle is so great that the sensor 20 is no longer working. However, no faulty distance signal is generated, as in the case with almost all directly measuring sensors, which were mentioned initially.

The angle of incidence of the light beam LS in some or all embodiments may be within an angular range between ±5 and ±70 degrees when it comes to measuring metal gearwheels 11. A particularly favourable angle of incidence is in the angular range between ±10 and ±50 degrees (these degrees are based on the assumption that an incident light beam LS perpendicularly to the surface corresponds to an angle of 0 degrees).

The coordinate measuring apparatus 10 may comprise a type of control system which is constructed from hardware and/or software. The purpose of this control system is to control the relative movements in the delivery of the optical switch sensor 20 to the gear workpiece 11 and to carry out the relative measuring movement(s) during the actual measurement(s).

The control system, on the one hand, predetermines the required movements, and on the other hand the control system receives actual data from the displacement sensors 19.X1, 19.Y1, 19.Z1 and/or the angle measuring system 16. In addition, the control system processes the switching signal s2.

FIG. 1 shows, by way of example, a software module SM as part of the controller 12, which is preferably part or core of the said control system. The software module SM and/or the control system is designed to determine from the actual data at least one geometric specification (e.g. the angular position relative to the rotational axis A1) of the object plane OE of the gearwheel 11.

Various measuring methods of the invention are now described below.

Determination of pitch errors on a gearwheel 11: With reference to FIGS. 8A to 8C, the method steps of a first exemplary measuring method of an embodiment for measuring pitch errors are now described. In these figures, an optical switch sensor 20 is shown which emits a light beam LS.

In order that the light beam LS reaches as steeply as possible the surface to be measured, the optical axis of the switch sensor 20 is laterally offset relative to the axis of rotation A1 of the component 11. This statement applies to all measuring methods presented herein.

Here, the axis of rotation A1 is perpendicular to the plane of the drawing while the optical axis of the switch sensor 20 lies in the drawing plane.

In FIG. 8A, the pitch circle TK of the spur gear 11 is shown as a dashed circle. In the case of a spur gear 11, the pitch circle TK is an infinitely thin section through the partial cylinder of the spur gear 11. Of the teeth which are arranged on the outer circumference of the spur gear 11, only six teeth are shown in FIG. 8A. These teeth are designated here by the reference symbols 1.1 to 1.6. The snapshot shown in FIG. 8A shows the sensor 20 in the starting position. The light beam LS here meets the right-hand tooth flank of the tooth 1.2 exactly at the intersection S1 with the pitch circle TK.

In order to reach this starting position, the relative distance between the switch sensor 20 and the right-hand tooth flank of the tooth 1.2 can be reduced by a relative movement (called feed movement) parallel to the Y1 axis in a preliminary method step, while the gear workpiece 11 is not rotationally driven for example. The starting position can be approached quickly and directly since the coordinate measuring apparatus 10 knows the target geometry and since the nominal distance NA of the sensor 20 is also a known variable. To reach the starting position, the sensor 20 need not be optically active. As soon as the starting position is reached, this position can be frozen.

In FIG. 8A, the predetermination of the starting position with an optically inactive sensor 20 is indicated by the sensor 20 not emitting a switching signal s2 (the switching signal s2 is therefore struck-though and shown as in the figure). The transfer of the sensor 20 into the starting position is carried out in the illustrated example by moving only the Y1 axis.

In a first method step of the actual measurement, the spur gear 11 is now rotated counter clockwise about its axis of rotation A1, wherein an angle sensor 16 is permanently monitored/evaluated during the rotation, which is assigned to the rotary-driven table 13 of the coordinate measuring apparatus 10 (as shown in FIG. 2). The corresponding rotary motion is marked in FIG. 8B with an col. In the context of this first method step, the rotary movement is monitored until the switch sensor 20 outputs a switching signal s2. The switching signal s2 can, for example, be stored in the memory 18 or evaluated by a software module. The displacement sensor 19.Y1 need not be read out during the actual measurement since the switch sensor 20 is stationary, or because it carries out a scanning movement parallel to the z axis or the x axis, as will be described later by way of examples.

As soon as the switch sensor 20 outputs a switching signal s2, the surface (object plane OE) of the right flank of the next tooth 1.3 has reached the nominal distance NA to the switch sensor 20. Since the nominal distance NA is known, the actual position of the intersection S2 can now be precisely calculated again from the actual angle position. FIG. 8B shows the moment of reaching the actual angle position.

The gear workpiece 11 is (continuously) further rotated and the light beam LS, or the sensor 20, detects the actual angle position of the right-hand tooth flank of the next tooth 1.5, etc.

The respective actual angle position is detected for each tooth flank, e.g. in that the angle measuring system 16 is read out.

These method steps are repeated as long as the gear workpiece 11 is rotated and/or until the sensor 20 is switched off.

Preferably, at least one full revolution of the gear workpiece 11 is performed until, for example, the actual angular positions of the intersection points with the pitch circle TK have been determined for all right flanks of the teeth 1 of the gearwheel 11.

Since the number of teeth z (for example, z=25) is known for the gearwheel 11, the (target) pitch angle $\tau$ can be calculated as follows: $\tau = 360°/z$.

If the spur gear 11 is an ideal spur gear, then all of the z teeth 1 are distributed at exactly equal angular distances $\tau$ along the 360 degree full circle, and all the teeth have the same tooth width. However, due to production-induced deviations, pitch errors are produced in practice in the case of gearwheels 11. This pitch error can be determined quickly and reliably with the aforementioned steps.

Since the pitch angle $\tau$ is accurately known, one can determine whether the nominal distance NA in FIG. 8B is exactly reached, for example, when the gearwheel 11 has been further rotated by exactly one pitch angle T. If the switching signal s2 is output before the exact pitch angle $\tau$ is reached, the right flank of the tooth 1.3 has an actual angular distance on the pitch circle TK which is smaller than the target angular distance. If the switching signal s2 is output only after the exact pitch angle $\tau$ has been reached, the right flank of the tooth 1.3 has an actual angular distance on the pitch circle TK which is greater than the target angular distance.

The measuring of the left-hand tooth flanks will now be described by way of example with reference to FIG. 8C. In order to be able to measure the left-hand tooth flanks of the gearwheel 11, the switch sensor 20 is brought into a new starting position relative to the gearwheel 11 by a displacement movement parallel to the X1 axis, as shown in FIG. 8C. The new starting position can be reached for example by a linear movement of the linear axis X1 and possibly by a small feed or clearance movement of the linear axis Y1. The original position of the switch sensor 20, which it assumed in measuring the right flanks, is shown in dashed lines in FIG. 8C. The actual measurement process for measuring the left flanks is the same as for measuring the right flanks.

The optical determination of the pitch error can be determined for all right-hand and/or all left-hand tooth flanks of a component 11, wherein the aforementioned method is applied accordingly.

The measurements described so far are preferably all in the pitch circle plane, which coincides with the drawing plane in FIGS. 8A to 8C. In the cases shown, the light beam LS was in each case in the pitch circle plane.

However, with the device 20 and the method of some embodiments, the pitch error can also be measured in several planes of the partial cylinder for example. In this case, additional movements parallel to the z axis (e.g. by using the Z1 linear axis) are required.

The previous examples have primarily been related to spur gear workpieces 11, since the measurements on the spur gear can be explained more simply. However, the embodiments can also be used for measuring bevel gear workpieces 11, worm gears, gear cutting tools and other gear workpieces 11.

Figure 9:
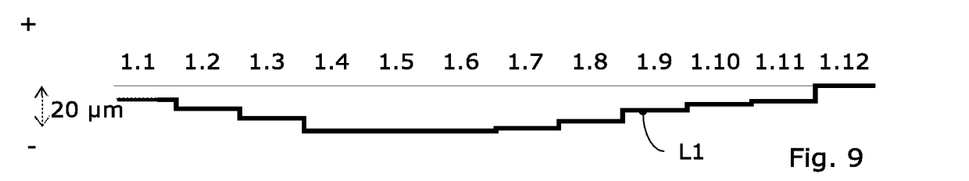
FIG. 9 shows a schematic representation of the accumulated tooth-to-tooth pitch error at the left-hand tooth flanks of a spur gear.

FIG. 9 shows, by way of example, a schematic representation of the cumulative tooth-to-tooth pitch error at the left-hand tooth flanks of the teeth of a spur gear 11. On the left, the scale of 20 µm is shown by a vertical double arrow. The measurement accuracy of the device of the embodiments can be in the range of 0.1-0.3 micrometers in order to allow useful statements with respect to the mentioned pitch error for example.

The example shown in FIG. 9 is a spur gear with a number of teeth z=12. The teeth are numbered from 1.1 to 1.12 in FIG. 9. The 12th and last tooth is the reference tooth. The cumulative pitch deviation is indicated by the polyline L1. Nearly all teeth 1.1 to 1.11 have a pitch error on the left-hand tooth flank.

Accordingly, the cumulative tooth-to-tooth pitch error on the right-hand tooth flanks of a spur gear can also be determined with the device and the method presented herein.

Measuring the tooth thickness on a gearwheel 11: If, for example, the tooth thicknesses of the teeth on the pitch circle TK are to be determined, then the right and left flanks of all the teeth can be measured, in order to subsequently calculate the tooth thickness from the angular distances.

Measuring the pitch error of the tooth gaps of a gearwheel 11: If, for example, the pitch error of the tooth gaps 3 of a spur or bevel gear 11 is to be determined on the pitch circle TK, one can either calculate this pitch error from the previously measured tooth-to-tooth pitch errors, or it can be measured directly with a corresponding method using the optical switch sensor 20 by scanning the left and right-hand tooth flanks with the light beam LS while the respective gear workpiece 11 is continuously rotated.

However, some embodiments also make it possible to carry out other measurements with the optical switch sensor 20. In the following, further examples are mentioned and briefly described, wherein the possibilities resulting from the use of an optical switch sensor 20 in a coordinate measuring apparatus 10 are almost unlimited.

Determination of flank line deviations on a gearwheel 11: For the measurement of the flank lines of the tooth flanks on the gearwheel component 11, a relative movement is carried out as a measuring movement which comprises a vertical movement component (parallel to the z axis). In addition to this vertical relative movement, a rotational movement of the gear workpiece 11 about the axis of rotation A1 is carried out during the measurement.

Figure 10A:
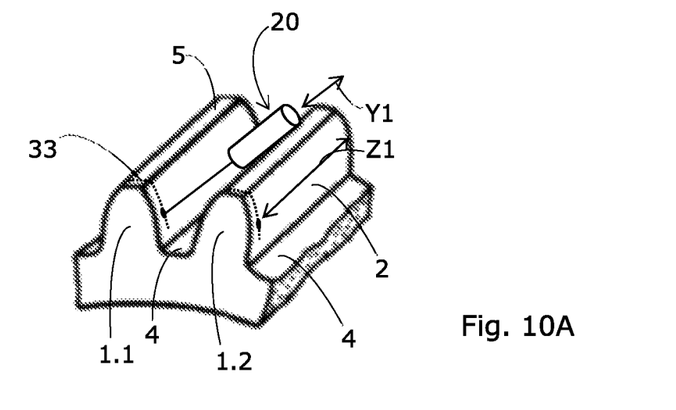
FIG. 10A shows a schematic perspective view of a section of a spur gear together with a further optical switch sensor, wherein the measurement of a (longitudinal) flank line is explained with reference to this figure.
Figure 10B:
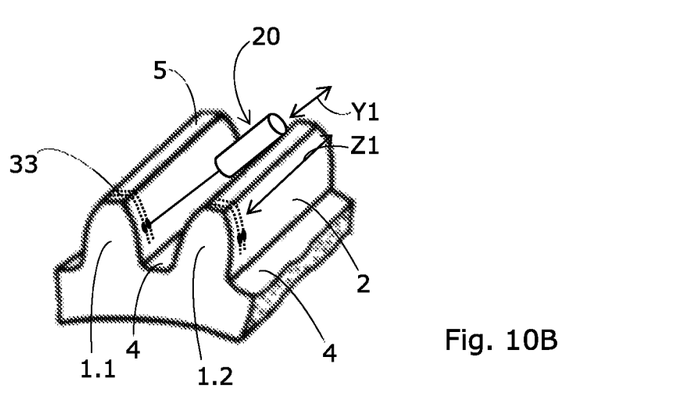
FIG. 10B shows a schematic perspective view of the section of the spur gear of FIG. 10A, wherein the relative position of the optical switch sensor and the spur gear is shown in an intermediate position after two revolutions of the spur gear.
Figure 10C:
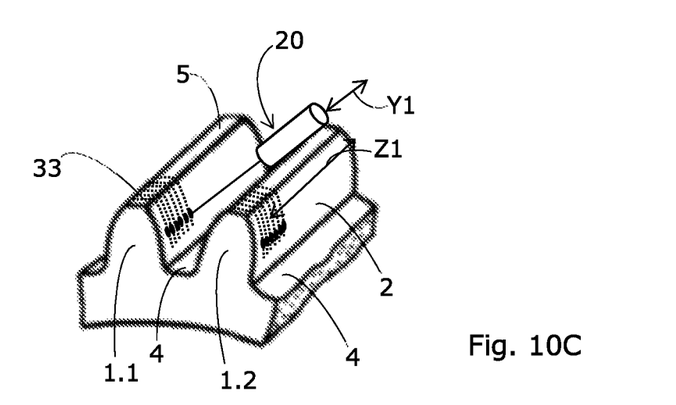
FIG. 10C shows a schematic perspective view of the section of the spur gear of FIG. 10A, wherein the relative position of the optical switch sensor and the spur gear is shown in an intermediate position after further rotations of the spur gear.

With reference to FIGS. 10A to 10C, the method for determining the flank line deviations is described by way of example. In these figures, only two teeth 1.1 and 1.2 of a gear workpiece 11 are shown again. After the sensor 20 has reached a starting position relative to the gear workpiece 11, the gear workpiece 11 is rotated and the output of the sensor 20 is monitored or evaluated.

FIG. 10A shows exactly the time at which the relative distance between the sensor 20 and the right flank of the tooth 1.1 reaches the nominal distance NA. Exactly at this moment, a switching signal s2 is output. Since the gear workpiece 11 rotates relative to the sensor 20, while the sensor 20 permanently transmits the light beam LS in the direction of the gear workpiece 11, a light track 33 is produced which, as indicated in FIG. 10A, extends along the circumference of the gear workpiece 11.

This light track 33 ends, in each case, above the tooth root 4, since the respective preceding tooth shades off the light beam LS. For each right-hand tooth flank, the sensor 20, or the device 10 respectively, determines the angular position of the gear workpiece 11 at which the switching signal s2 is output in each case. If this is an ideal gear workpiece 11, then the measuring points determined in this way each lie exactly one pitch angle $\tau$ apart. On each right-hand flank of the teeth 1.1 and 1.2, one measuring point each is represented by a small black dot which is located on the light track 33.

In order to now be able to measure the flank longitudinal profile using the method presented herein, the sensor 20 is displaced relative to the gear workpiece 11 parallel to the z axis (continuously or in steps). This can occur for example by activating the Z1 linear axis. This Z1 linear axis permits a movement of the sensor 20 with a constant y-spacing along the tooth flank. This movement of the sensor 20 takes place parallel to the axis of rotation A1, if it concerns a straight-toothed spur gear 11, as shown in FIG. 10A.

If the sensor 20 is displaced continuously relative to the gear workpiece 11 parallel to the z axis, a spirally circumferential light track 33 is produced, as shown in FIGS. 10A to 10C. However, if this linear movement only takes place step by step, several separate light track circles are produced.

FIG. 10A shows the situation after a first complete revolution of the gear workpiece 11 about the axis of rotation A1. If the relative movement of the sensor 20 relative to the gear workpiece 11 takes place slowly compared to the angular speed ω1, then the individual paths of the spirally circumferential light track 33 lie close together. FIG. 10B shows the situation after a second revolution of the gear workpiece 11. Again, the measurement points are represented by small black dots.

FIG. 10C shows the situation after several revolutions of the gear workpiece 11. Each path of the light track 33 has a measuring point on each tooth flank. By means of the arrangement of the measuring points along a flank (longitudinal) line, it can be seen that these measuring points lie in slightly different positions. The course of the flank (longitudinal) lines of all right-hand flanks can be determined from the individual measuring points, together with the angle information and the z position of the sensor 20.

In order to determine the flank (longitudinal) line of all the left-hand flanks, the sensor 20 should be moved into a different starting position. The method remains otherwise the same.

The function of the device 10 is explained in more detail below with reference to a simple example.

We assume, for example, that the gear workpiece 11 rotates at a speed of one revolution per second. A total of 60 full revolutions of the gear workpiece 11 are made while the sensor 20 performs a slow, continuous movement parallel to the z axis (scanning movement) so that the entire tooth width of the gear workpiece 11 is traversed during the 60 full revolutions. This means that the tooth flanks (left and right) of all teeth with a point density of 60 points as well as the pitch (also left and right) can be measured in two minutes. The described measurement additionally has the advantage that it is independent of the number of teeth.

Measurement of the tooth profile on a gearwheel 11: On the same basis, the profiles of all teeth can also be determined by continuous, fast rotation of the gearwheel component 11 with simultaneous displacement of the sensor 20 parallel to the x-direction (scanning movement).

Here, too, a simple numerical example: We assume, for example, that the gear workpiece 11 rotates at a speed of one revolution per second. A total of 60 full revolutions of the gear workpiece 11 are made while the sensor 20 performs a slow, continuous scanning movement parallel to the x axis so that the entire profile length (profile depth) is traversed. This means that in two minutes the profiles (left and right) of all teeth with a point density of 60 points and the pitch (also left and right) will be measured. This measurement is also independent of the number of teeth.

In certain embodiments the measuring method comprises only a small number of linear relative feed movements for reaching a starting position and, during the actual measurement, only one measuring movement (scanning movement) paired with one or more full revolutions of the gear workpiece 11. Such embodiments make optimal use of the high speed of the optical switch sensor 20 in combination with a periodic distance change which results from the rotation of the gear workpiece 11.

This means that the optical switch sensor 20 either remains stationary in the space during measurement while the gear workpiece 11 is rotating, or the optical switch sensor 20 makes a (linear) scanning movement during measurement while the gear workpiece 11 rotates.

In the previously described examples, a coordinate measuring apparatus 10 with four NC-controlled axes X1, Y1, Z1, A1 is used. It is obvious that the axes can also be configured differently. The X1 axis and/or the Y1 axis, for example, can be replaced by a pivot axis. The total number of axes can also be smaller than the four axes X1, Y1, Z1, A1 mentioned. The coordinate measuring apparatus 10 can also have more than four axes.

In embodiments in which the sensor 20 is directly advanced into the starting position, the sensor 20 can also be brought into the starting position manually (by means of displacement and/or pivoting). In this case, the corresponding NC-controlled axis (e.g. the Y1 axis) can be omitted.

The axis of rotation indicated by A1 does not necessarily have to be designed as NC-controlled axes. It is important that the axis of rotation A1 has an angle measuring system which operates highly accurately. The drive of the axis of rotation A1 can be motorized without precise NC control or can occur even manually.

As may be recognized by those of ordinary skill in the pertinent art based on the teachings herein, numerous changes and modifications may be made to the above described and other embodiments of the present invention without departing from the spirit of the invention as defined in the claims. Accordingly, this detailed description of embodiments is to be taken in an illustrative, as opposed to a limiting sense.

What is claimed is:

1. An apparatus, comprising:
    a rotatably driveable receptacle for a gear workpiece;
    a plurality of axes; and
    an assembly;
    wherein the plurality of axes are configured to perform feed movements and measuring movements of the assembly relative to the gear workpiece using at least one of the plurality of axes;
    wherein the assembly includes an optical, contactless operating switch sensor that comprises a focus trigger sensor, wherein the focus trigger sensor is configured to emit a light beam along an optical axis in a direction of an object plane of the gear workpiece;
    wherein the focus trigger sensor is movable in a scanning movement relative to the object plane by using one or more of the axes;
    wherein the focus trigger sensor is adapted to generate and output a switching signal when the object plane has reached a nominal distance relative to the focus trigger sensor; and
    wherein the apparatus is adapted to read and/or store momentary coordinate information of the apparatus at a moment the focus trigger sensor outputs said switching signal.

2. The apparatus according to claim 1, wherein the focus trigger sensor is positioned obliquely with respect to the object plane.

3. The apparatus according to claim 1, wherein an angle of the light beam to the object plane is in an angular range of ±5 to ±70 degrees.

4. The apparatus according to claim 1, wherein the focus trigger sensor defines a 2-segment or a 4-quadrant configuration.

5. The apparatus according to claim 4, wherein the focus trigger sensor defines a 4-quadrant configuration comprising, on a receiving side thereof, an optically sensitive component having four sensor regions arranged as four quadrants in a common plane, wherein each of the four sensor regions is connected to a respective measuring input of an evaluation device, and generates the switching signal when all four sensor regions receive the same reflected light intensity of the light beam.

6. The apparatus according to claim 5, wherein the optically sensitive component is a photodiode.

7. The apparatus according to claim 1, wherein the focus trigger sensor is configured to use the Foucault principle, and has an imaging optical system configured to emit the light beam on a transmitting side thereof, and a plurality of differential diodes on a receiving side thereof configured to receive the light beam reflected from the object plane.

8. The apparatus according to claim 1, wherein the focus trigger sensor includes a laser point sensor including a laser configured to emit the light beam.

9. The apparatus according to claim 8, wherein the laser includes a laser diode.

10. The apparatus according to claim 1, further including:
    at least one displacement sensor assigned to one of the plurality of axes, and
    at least one angle sensor associated with the rotationally drivable receptacle.

11. The apparatus according to claim 10, further including:
    a memory configured to store data from the at least one displacement sensor and the at least one angle sensor relating to the position of the switch sensor relative to the object plane of the gear workpiece when the focus trigger sensor generates the switching signal.

12. The apparatus according to claim 10, further including:
    a software module configured to process data from the at least one displacement sensor and the at least one angle sensor relating to the position of the switch sensor relative to the object plane of the gear workpiece when the focus trigger sensor generates the switching signal.

13. The apparatus according to claim 10, further including a software module configured to determine at least one geometric specification of the object plane of the gear workpiece using data from one or more of the at least one displacement sensor or the at least one angle sensor.

14. The apparatus according to claim 13, wherein the software module is part of a control system.

15. The apparatus according to claim 1, further comprising a regulating system including a software module configured to perform an automated measuring operation for one or more of:
    a pitch measurement of the gear workpiece;
    a measurement of at least one flank line of the gear workpiece; or
    a measurement of a tooth profile of the gear workpiece.

16. A method comprising:
    introducing a gear workpiece into an apparatus, wherein the apparatus includes a rotatably driveable receptacle for a gear workpiece;
    a plurality of axes;
    and
    an assembly;
    wherein the plurality of axes are configured to perform feed movements and measuring movements of the assembly relative to the gear workpiece using at least one of the plurality of axes;
    wherein the assembly includes an optical, contactless operating switch sensor that comprises a focus trigger sensor, wherein the focus trigger sensor is configured to emit a light beam along an optical axis in a direction of an object plane of the gear workpiece;
    wherein the focus trigger sensor is movable in a scanning movement relative to the object plane by using one or more of the axes;
    wherein the focus trigger sensor is adapted to generate and output a switching signal when the object plane has reached a nominal distance relative to the focus trigger sensor; and
    wherein the apparatus is adapted to read and/or store momentary coordinate information of the apparatus at a moment the focus trigger sensor outputs said switching signal;
    performing a first relative feed movement by using at least one of the plurality of axes of the apparatus and moving the switch sensor to a starting position relative to the object plane of the gear workpiece; and optically measuring the gear workpiece using the switch sensor, wherein the optically measuring step comprises:
rotationally driving the gear workpiece about a rotational axis thereof,
generating switching signals with the switch sensor when the object plane reaches the nominal distance relative to the focus trigger sensor,
detecting data relating to the apparatus, and
determining geometrical data of the gear workpiece from the detected data.

17. The method according to claim 16, further comprising performing a scanning movement with the switch sensor during the rotationally driving step.

18. The method according to claim 16, wherein the optically measuring step includes measuring one or more of:
a pitch of the gear workpiece;
at least one flank line of the gear workpiece; or
a tooth profile of the gear workpiece.

19. The method according to claim 16, wherein the focus trigger sensor is positioned obliquely with respect to the object plane of the gear workpiece.

20. The method according to claim 16, further including emitting a light beam from the focus trigger sensor at an angle to the object plane in an angular range of ±5 to ±70 degrees.

* * * * *